(12) United States Patent
Bregenzer

(10) Patent No.: US 7,768,897 B2
(45) Date of Patent: Aug. 3, 2010

(54) LOW FRICTION TURNTABLE SLIP MAT AND METHOD OF USING SAME

(75) Inventor: Derrick Bregenzer, Battle Creek, MI (US)

(73) Assignee: Creative Turntable Technologies, LLC, Battle Creek, MI (US)

( * ) Notice: Subject to any disclaimer, the term of this patent is extended or adjusted under 35 U.S.C. 154(b) by 1069 days.

(21) Appl. No.: 11/428,135

(22) Filed: Jun. 30, 2006

(65) Prior Publication Data

US 2008/0001056 A1 Jan. 3, 2008

(51) Int. Cl.
*G11B 23/03* (2006.01)
*G11B 25/04* (2006.01)

(52) U.S. Cl. .................................. 369/271.1
(58) Field of Classification Search .............. 360/271.1; 369/271.1, 292, 289.1, 263.1, 267
See application file for complete search history.

(56) References Cited

U.S. PATENT DOCUMENTS

| | | | | |
|---|---|---|---|---|
| 3,973,778 A | * | 8/1976 | Marks et al. | 369/266 |
| 3,984,112 A | * | 10/1976 | Marks et al. | 369/271.1 |
| 3,997,174 A | * | 12/1976 | Kawashima | 369/271.1 |
| 4,079,946 A | * | 3/1978 | Hara et al. | 369/271.1 |
| 4,532,622 A | * | 7/1985 | Newbold | 369/271.1 |
| 5,781,525 A | * | 7/1998 | Neulinger | 369/271.1 |
| 2005/0127309 A1 | * | 6/2005 | Spencer | 250/557 |
| 2006/0093777 A1 | * | 5/2006 | Handy et al. | 428/64.1 |
| 2007/0079315 A1 | * | 4/2007 | Mittersinker | 720/656 |
| 2008/0148922 A1 | * | 6/2008 | Morra | 84/600 |

FOREIGN PATENT DOCUMENTS

GB 2404076 A * 1/2005

* cited by examiner

*Primary Examiner*—Julie Anne Watko
(74) *Attorney, Agent, or Firm*—Price, Heneveld, Cooper, DeWitt & Litton LLP

(57) ABSTRACT

A phonograph turntable slip mat (200) includes a circular surface (201) extending around the perimeter of the mat for supporting a phonograph record. A recessed section (203) is located within the circular surface and extends below the circular surface (203) for contacting the surface of a turntable platter (204). The invention exhibits less friction and surface resistance when in contact with the turntable platter (204), providing superior performance when compared with conventional slip mats.

14 Claims, 3 Drawing Sheets

LOW FRICTION TURNTABLE SLIP MAT AND METHOD OF USING SAME

FIELD OF THE INVENTION

The present invention relates generally to phonograph turntables and, more particularly, to slip mats used with a phonograph turntable.

BACKGROUND

Phonograph slip mats are known in the art and are essentially circular pieces of slippery cloth or synthetic material that are designed to allow disc jockeys (DJs) to manipulate a vinyl phonograph record on a phonograph turntable independently of the platter. The slip mat is positioned directly between the record and the deck platter. The slip mat reduces friction, allowing the platter to continue to turn underneath the record. When in operation, the user can hold a record in a fixed postion for "slip-cueing." When slip-cueing at the moment the user wishes to start playing the record, the turntable continues to rotate underneath the record. Thus, the record does not need to rotate up to speed as it has always been rotating underneath the record. Slip-cueing is used by DJs for beatmatching when trying to start a record with the bass beats playing simultaneously with another record. Secondly, "back spinning" is used by DJs who pull a record back and forth to make a scratching sound on the record. A back spin involves spinning the record to retard, arrest, or reverse the linear motion of the record. Slip mats used in the prior art often prevent the platter from being pulled both in forward and reverse direction. This creates too much weight and inertia to back spin the record in a proper manner which can create undesired distortion.

FIG. 1 illustrates a typical slip mat 100 as used in the prior art which is a flat disc 101 which sits upon the platter 103 of the turntable 105. The flat disc 101 includes a cutout area 107 which fits over the record centering peg 109. The centering peg 109 is positioned substantially at the center of the cutout area 107. This type of slip mat is disclosed in U.S. Patent Publication No. 2006/0093777 to Handley et al., which is herein incorporated by reference in its entirety. A common problem with the typical slip mat is that has a high amount of friction between record and turntable platter. This results in problems with both beat-matching and back spin. Thus, a new slip mat is needed that will provide very low friction with the platter enabling a DJ to provide more precise control to make better customized sounds with the turntable and phonograph record.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
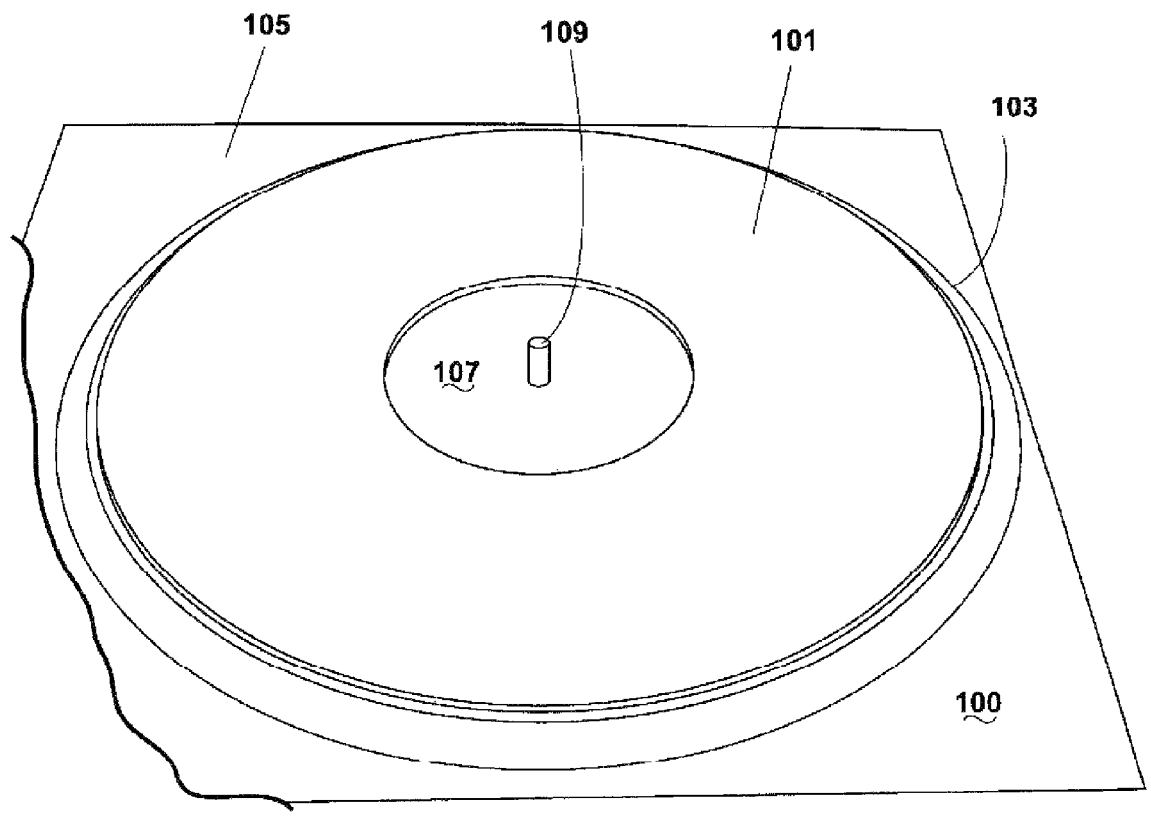
FIG. 1 is a perspective view of a slip mat as used in the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the elevated turntable slip mat. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 2:
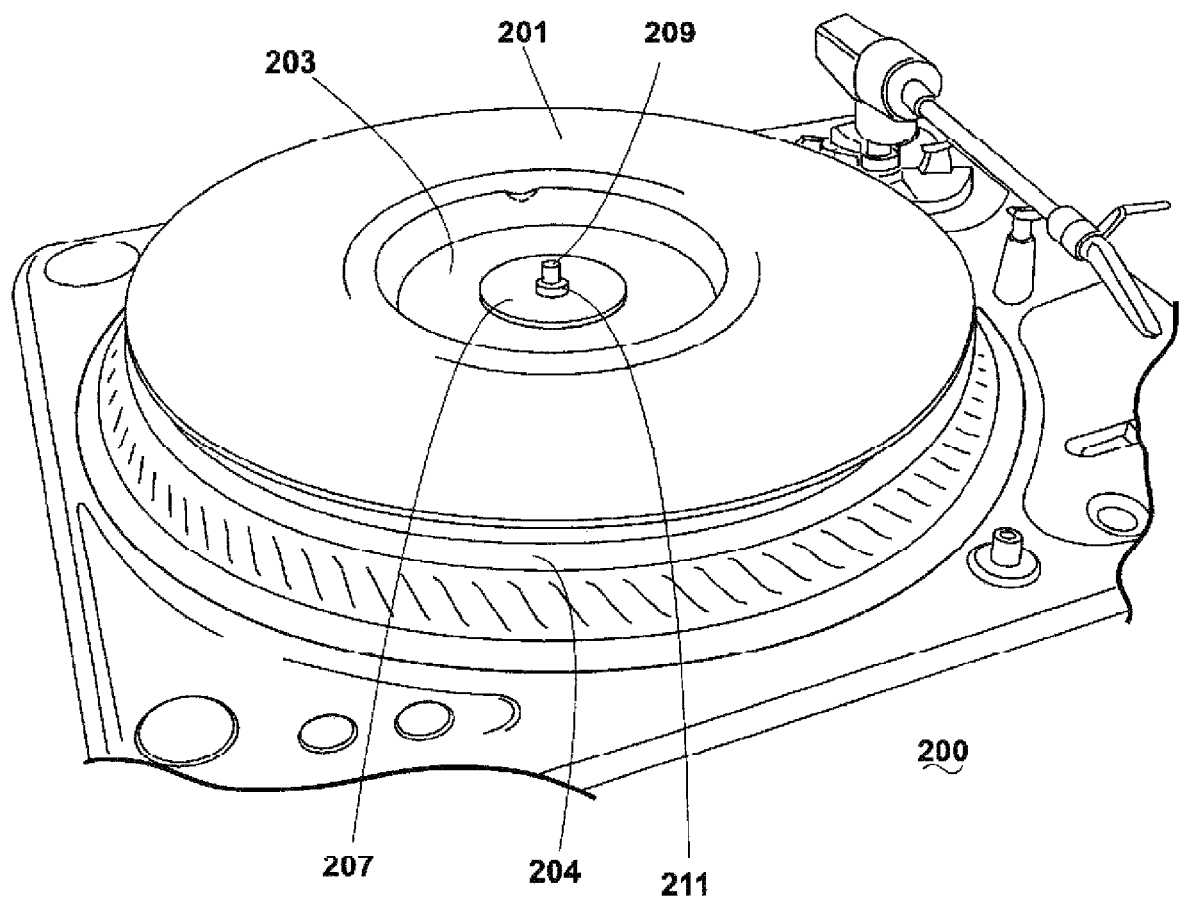
FIG. 2 is perspective of view of the elevated turntable slip mat as used in accordance with the present invention.
Figure 3:
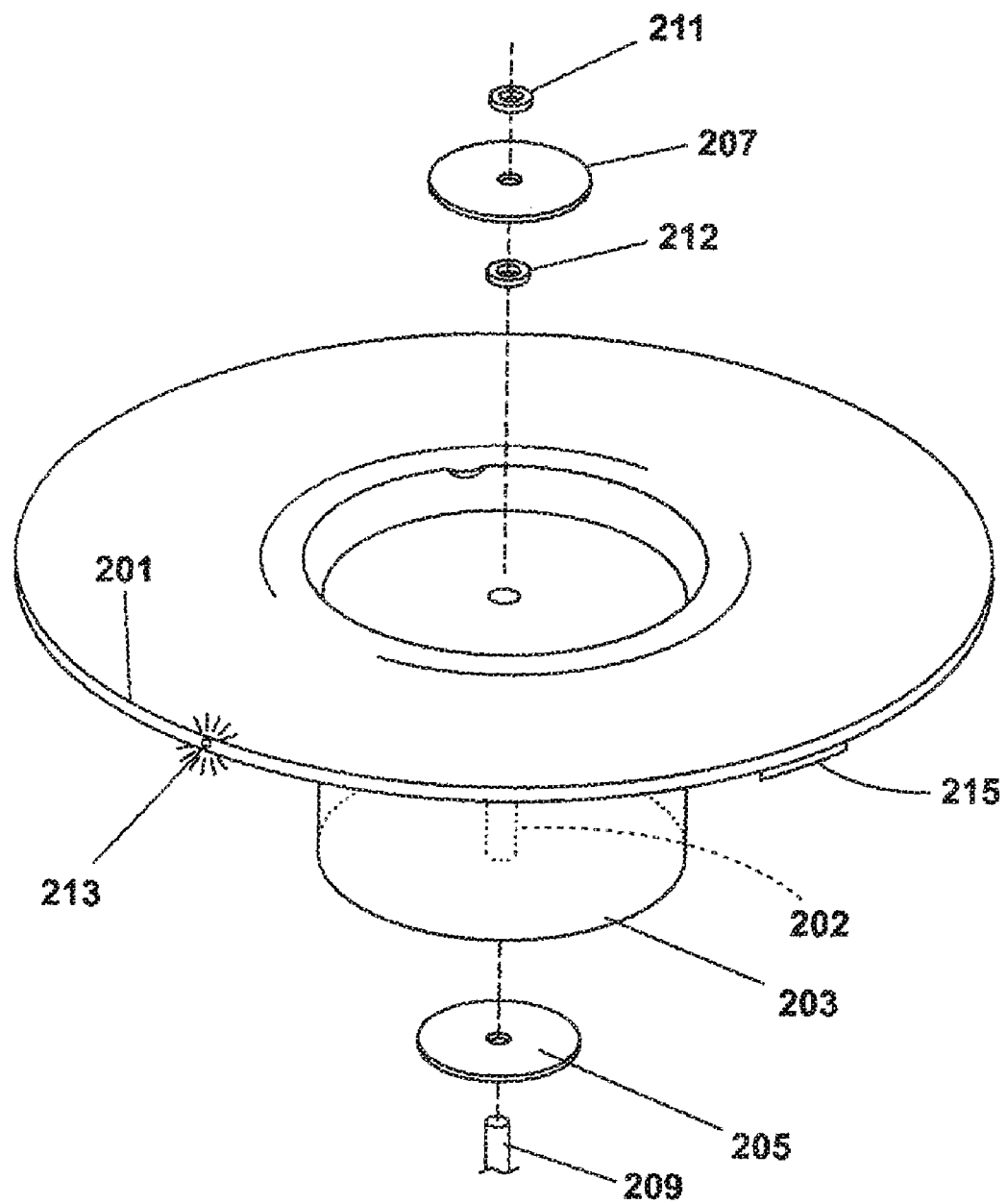
FIG. 3 is side view of the invention as shown in FIG. 2.

FIG. 2 illustrates a perspective view of the low-friction turntable slip mat 200 in accordance with the invention. The slip mat 200 is substantially circular in shape and includes a flat top surface 201 which contacts the phonograph record (not shown) on the bottom surface of the record. The flat top surface 201 is sized to be approximately the same size as a 33 revolutions-per-minute (RPM) phonograph record. As seen in both FIG. 2 and FIG. 3, the inner radius of the slip mat 200 includes a recessed section 203 that extends below the flat surface 201 to contact the surface of the phonograph platter 204. The recessed section 203 includes an aperture 202 for use with a centering peg. The recessed section 203 is specifically sized in order to provide substantially low friction between the recessed section 203 and the phonograph platter 204. In order to facilitate easy slippage between recessed section 203 and the platter 204, the slip mat 200 may typically be made from metal or plastic materials having a smooth surface. In order to provide a decorative appearance, a side 211 of the flat top surface 201 may include one or more illumination devices 213 such as light-emitting diodes (LEDs) or the like which act to better show the spinning motion of the slip mat 200 when in use. The illumination devices 213 are powered by a battery source 215 which may be fastened to the underside of the top surface 201 using a battery holder or other fastening mechanism.

In operation, a first flat washer 205 is positioned over the record centering peg 209 onto the platter 204. Next, the slip mat 200 is positioned over the centering peg 209 and then a second flat washer 207 is positioned over the centering peg 209 on the slip mat 200. A friction clamp such as one or more split lock washers 211, 212 are then positioned on the centering peg 209 over the second flat washer 207 to hold the low-friction turntable slip mat assembly in place. As will be evident to those skilled in the art, the slip mat 200 enables a DJ to have precise control over a phonograph record when slip-cueing and/or back spinning the record. Since the recessed section 203 provides less friction and resistance when in contact with the turntable platter 204, the invention provides superior performance when compared with conventional slip mats used in the prior art.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A phonograph turntable slip mat comprising: a first circular surface extending around the perimeter of the mat for supporting a phonograph record; a recessed section positioned below the circular surface; and wherein the recessed section comprises a cylindrical surface and a second circular surface; and wherein the second circular surface contacts a surface of a turntable platter for allowing the first circular surface and phonograph record to be manually slipped along the surface of the turntable platter.

2. A phonograph turntable slip mat as in claim 1, wherein the recessed section includes an aperture for accepting a centering peg of the turntable.

3. A phonograph turntable slip mat as in claim 1, wherein the turntable slip mat fastens to a centering peg using at least a mechanical fastener.

4. A phonograph turntable slip mat as in claim 1, wherein the slip mat includes at least one illumination device positioned on an edge of the slip mat.

5. A phonograph turntable slip mat as in claim 4, further comprising a battery holder for supplying power to the at least one illumination device.

6. A turntable slip mat for use with a phonograph turntable comprising;
  a flat surface for supporting the surface of a phonograph record;
  a recessed section positioned substantially under a center portion of the flat surface; and
  wherein the recessed section is used to contact the top surface of a phonograph platter for allowing the flat surface and phonograph record to be manually slipped along the top surface of the turntable platter while the turntable platter is in motion.

7. A turntable slip mat as in claim 6, wherein the flat surface extends above the recessed section.

8. A turntable slip mat as in claim 6, wherein the recessed section includes an aperture for a platter centering peg.

9. A turntable slip mat as in claim 6, wherein a side edge of the flat surface includes at least one illumination device.

10. A turntable slip mat as in claim 9, wherein the at least one illumination device is powered using a battery located under the flat surface.

11. A turntable slip mat for use with a phonograph turntable comprising:
  a substantially flat substrate for supporting the surface of a phonograph record;
  an illumination device positioned within a side edge of the substrate;
  a recessed section positioned substantially under a center portion of the flat substrate; and
  wherein the recessed section is used to contact the top surface of a phonograph platter for allowing the substrate and phonograph record to be manually slipped along the top surface of the turntable platter while the turntable platter is in motion.

12. A turntable slip mat as in claim 11, wherein the recessed section includes an aperture for a platter centering peg.

13. A turntable slip mat as in claim 11, where the illumination device is at least one light emitting diode (LED).

14. A turntable slip mat as in claim 11, further comprising a battery compartment located under the flat surface.

* * * * *